United States Patent [19]

Musil

[11] Patent Number: 4,937,921
[45] Date of Patent: Jul. 3, 1990

[54] ANTI-SIFTING BELT FASTENER ASSEMBLY

[75] Inventor: Edward C. Musil, Lyons, Ill.

[73] Assignee: Flexible Steel Lacing Company, Downers Grove, Ill.

[21] Appl. No.: 351,171

[22] Filed: May 12, 1989

[51] Int. Cl.⁵ .............................................. F16G 3/02
[52] U.S. Cl. ..................................... 24/33 C; 24/33 R
[58] Field of Search ................... 24/33 C, 33 B, 33 R, 24/33 P, 33 F, 33 M; 474/256, 257, 255, 204, 205, 206

[56] References Cited

U.S. PATENT DOCUMENTS

| | | | |
|---|---|---|---|
| 1,300,437 | 4/1919 | McNicol | 24/33 B |
| 2,086,449 | 7/1937 | Timmerbeil | 24/33 C |
| 3,107,406 | 10/1963 | Tebb | 24/33 C |
| 4,315,349 | 2/1982 | Stolz | 24/33 C |
| 4,625,369 | 12/1986 | Musil | 24/33 B |
| 4,653,156 | 3/1987 | Stolz et al. | 24/33 R |
| 4,708,558 | 11/1987 | Musil | 24/33 C |

FOREIGN PATENT DOCUMENTS

| | | | |
|---|---|---|---|
| 881833 | 5/1943 | France | 24/33 C |
| 1001187 | 2/1952 | France | 24/33 C |
| 1069989 | 7/1954 | France | 24/33 C |
| 1115251 | 4/1956 | France | 24/33 C |
| 634028 | 3/1950 | United Kingdom | 24/33 C |
| 764530 | 12/1956 | United Kingdom | 24/33 C |

Primary Examiner—Victor N. Sakran
Attorney, Agent, or Firm—Fitch, Even, Tabin & Flannery

[57] ABSTRACT

An anti-sifting arrangement for plate and wire-type belt fasteners with hinge loops. A block of flexible material, such as an open-cell reticulated foam, is disposed in the hinge loop area and spans adjacent belt fasteners. A hinge pin inserted into the meshed hinge loops compresses the foam block which also expands to fill the voids between the belt ends, hinge loops and hinge pin to prevent sifting of particulate matter through the splice. The foam block is retained in position by the belt stops or the end of the belt and may be readily inserted or removed from the belt fastener assembly.

2 Claims, 2 Drawing Sheets

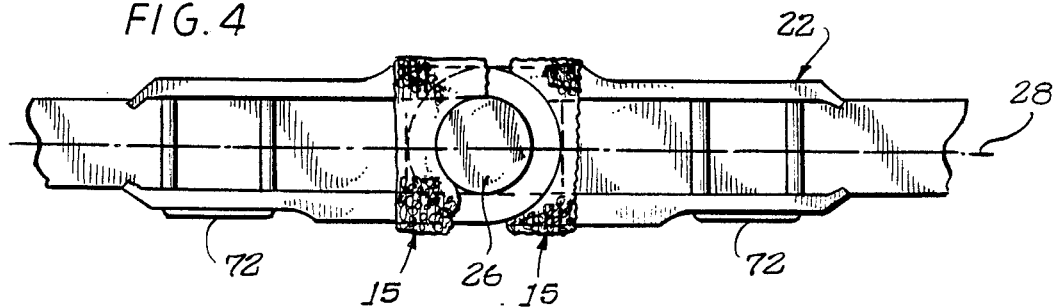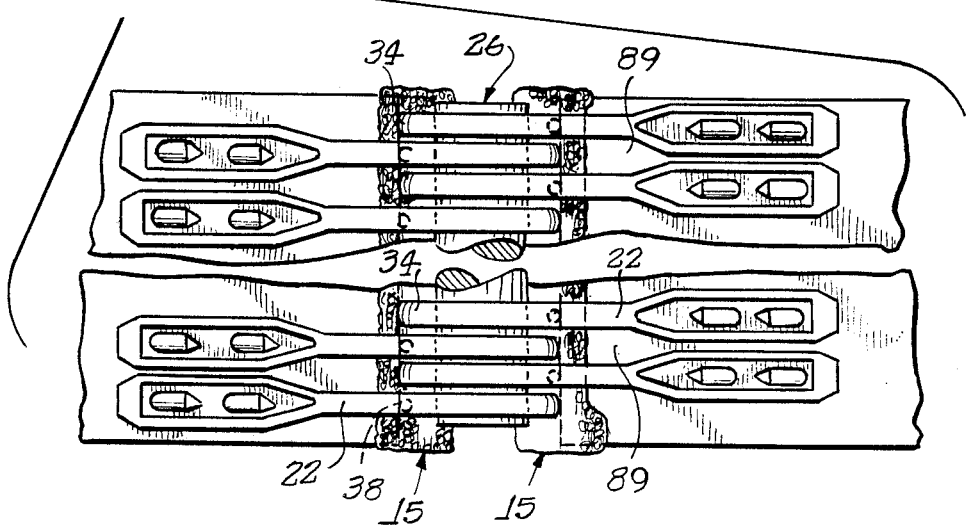

ANTI-SIFTING BELT FASTENER ASSEMBLY

BACKGROUND OF THE INVENTION

The present invention relates to an improved conveyor belt fastener and more particularly to a strip or aligned row of a plurality of preformed individual fasteners with an anti-sifting means for conveyor belts.

Hinge belt fasteners are generally secured in a juxtaposed array or alignment at one belt end, intermeshed with similar fasteners at the second belt end and secured in this mated arrangement by a rod or hinge pin. These intermeshed belt fasteners and hinge pin form a belt splice for a continuous belt.

Conveyor belts are frequently provided in predetermined lengths, with belt fasteners securing the two ends of the belt lengths together to form a continuous belt. The belt fasteners are stapled, riveted or otherwise fastened to one of the belt ends and thereafter joined together by this hinge pin or hinge rod.

Goods transported on the assembled conveyor belts often are or contain particulate matter with entrained, small sieve size particles, as well as fine, powdery products, which may be dust laden. For example, when transporting grain small fines may sift through the belt splice. A particular problem is the sifting of coal dust through the splice. The sifted coal dust may build up as a cake. Dust is a problem in coal mines as it maybe a source of an explosion; or when accumulated beneath a conveyor, the trail of the coal dust may serve as a wick or fuse along which fire could travel from one location to another location. Thus, sifting grain dust or coal dust may provide a large volume of airborne particulate matter, which provides a large surface area for rapid oxidation and thus a potentially explosive environment. Consequently, it is desirable to minimize dust flowing through a traveling splice on a conveyor belt.

Stated differently, a typical belt splice has a gap separation and a considerable volume of "dust" or particulate matter may sift through the coupling assembly joining the belt ends in a continuous belt transport system. Although there have been efforts to minimize the sifting of fine particles through the belt to reduce the entrained particulates, these anti-sifting devices have not met with wide spread commercial success.

A problem with anti-sifting devices heretofore developed is that they often interfered with the sliding insertion of a hinge pin making it difficult to insert or remove the hinge pin. People doing the splicing may use a hinge pin of a size that will not slide readily through these anti-sifting devices. Other users want anti-sifting devices that are easily added or removed from the splice; and these prior art devices often are molded or stapled in position and are not readily added or removed in the field, as desired by the users. Additionally, these molded inserts are relatively expensive and a more cost effective anti-sifting device is needed.

Indicative of the earlier efforts at the formation of anti-sifting joints in continuous belt arrangements is U.S. Pat. No. 4,653,156, wherein a conveyor fastener with a plurality of elements couples the belt ends. A preformed molded body of solid rubber with eye lug grooves and fin elements is aligned in the fastener with the respective eye lugs of the connecting strip of plural fastener elements, which solid molded body at least partly encompasses the coupling rod. The fin elements and eye grooves form pockets to receive the mating outer parts of the alternative interlocking conveyor belt fastener strips. Often, the size of the hinge pin is varied to join the belt ends together and for smaller diameter pins there will be spaces into which and through which dust or fines may travel. If a larger size hinge pin is used, the solid rubber may grab and hold the pin making it difficult to slide into position.

U.S. Pat. No. 4,540,389 to Ramsey utilizes a planar spacer and two outer planar belt clamping elements. Each of the belt ends is clamped between a belt clamping element and the planar surface and secured by at least one through-bolt and nut. This provides an extending bar of the planar spacer, clamping elements and retained belt ends, which bar is generally perpendicular to the plane of the belt and extends outwardly from its upper surface. Thus, the belt ends are joined and sifting may be minimized but the belt ends are not provided in the belt longitudinal operating plane of the belt; there is a discontinuity in the belt surface, and there is the potential for an increase in the noise level as the belt traverses the sprockets and rollers.

Belt splicing devices with overlapping plates and/or belt ends are noted in U.S. Pat. Nos. 9,080 (Smith); 1,918,257 (Forsyth); 2,330,434 (Lazzeu); 2,446,311 (Traxler); 3,093,005 (Dean); and, 3,327,359 (Wiese). However, these devices are clamping and securing devices which are stiff and relatively inflexible apparatus. Although these assemblies will in some manner and to some degree prevent the filtering of material through the belt joint, they are not operable with a plurality of individual and intermeshed fasteners joined by a pin or other connection. The illustrated clamps or brackets are relatively inflexible and not applicable to multiple fastener assemblies, particularly thin-armed fasteners with looped ends extending from each belt end.

French Patent No. 2,593,872 to Jean F. Schick illustrates a conveyor belt junction with two sets of U-shaped clasps wrapped around a hinge pin fastened by staples against removal and enclosing shaped filler profiles of a generally compressible material. A V-shaped continuous-profile element of a compressible material is formable to fill voids, and is provided with a preformed semicircular end. The preformed semi-circular ends are aimed and sized to receive a given diameter for a hinge pin. The insertable element conforms to the faces of the extending arms and is a compressible material that is displaced to fill voids between the fingers of the clasps at final assembly. The filler profiles are not removable and will engage and make difficult the insertion of a large diameter hinge pin.

Another anti-sifting device of the prior art is a strip swellable material which has an adhesive for attaching to the cut belt end. In coal mines, the ends of a belt may be coated with coal dust, and the adhesive on the strip often cannot be made to stick to the cut belt end. Also, the strip is small in size until water is applied to the strip. The water causes the strip to swell and to increase in size. There are often wet, dripping areas or other sources of water in a mine and the strip may be wetted in an accidental or incidental manner prior to being properly positioned adjacent the belt fasteners and the untimely subsequent swelling of the strip makes it difficult or impossible to use the strip. Such strips of swellable material have serious shortcomings.

SUMMARY OF THE INVENTION

The present invention provides an improved belt fastener for the contacting conveyor belt end including an anti-sifting structure for use with a hinge pin at the belt splice. The anti-sifting member does not interfere with either the assembly or operation of the belt fasteners.

A plurality of the individual belt fasteners, either the plate or wire type, are arranged in an aligned, juxtaposed arrangement having a space between adjacent hinge loops on the belt fasteners. A length of the loop section of each fastener of the plurality of fasteners. The preferred anti-sifting means comprises an elongated block of soft open cell, easily compressed, foam which can be easily inserted or removed from the hinge loops. The belt ends are pressed against the belt stops of a set of connectors, which are as far back as possible in the gap or mouth defined between the upper and lower surfaces of the connection arms. The individual connector elements or loop sections of one belt end are intermeshed or mated with the connector elements of the opposite end of the conveyor belt, and in this mated arrangement the connector elements cooperate to define a hinge pin passage between their opposing, meshed hinge loops. In the mated arrangement, the opposed hinge loops, which are nested in the separation distance between the adjacent loops of each opposed set of connectors contacts, compresses and displaces the flexible material to fill the voids between and around the belt ends, individual connectors and the coupling hinge pin. The intermeshing assembly is not impeded in its ability to rotate about the hinge pin as the flexible material is very easily deformed; it does not move into the hinge pin aperture and thus does not impede hinge pin insertion; it is inexpensive; it can be easily replaced by removal of the hinge pin and separation of the mated loops, and reassembly of the mating loops and hinge pin; and, it will prevent sifting of fine particulate material through the hinge joint at a minimal cost; and, as it is flexible and interchangeable, a large inventory of preformed or premolded inserts for the different size fasteners is not required, which reduces inventory carrying costs. In this fastener configuration with a belt stop, the outer or furthest extending radius of each intermeshed connector element is generally in relative alignment or spatial relationship between the inner and outer extremities of the aligned positive belt stops. Therefore, the positive stops are more deeply recessed in the fastener gap and the belt end is consequently positioned as deeply as possible in the separation or mouth of each individual connector element.

The individual preformed connector elements of the connector strip of the present invention can be interconnected and maintained in an aligned fashion by a connecting means, such as a wire secured to and extending between the inside surface of an arm of each connector, without being hindered or impeded by the anti-sifting structure. The anti-sifting material is easily severed to conform its length to the requirements of the belt and fastener.

BRIEF DESCRIPTION OF THE DRAWINGS

In the Figures of the drawings, like reference numerals components, and in the drawings:

FIG. 4 is a side view of the as-assembled ends of the conveyor secured by a hinge pin; and FIG. 5 is a top view of the as-assembled anti-sifting belt fasteners.

DETAILED DESCRIPTION OF THE PREFERRED EMBODIMENT

Figure 1:
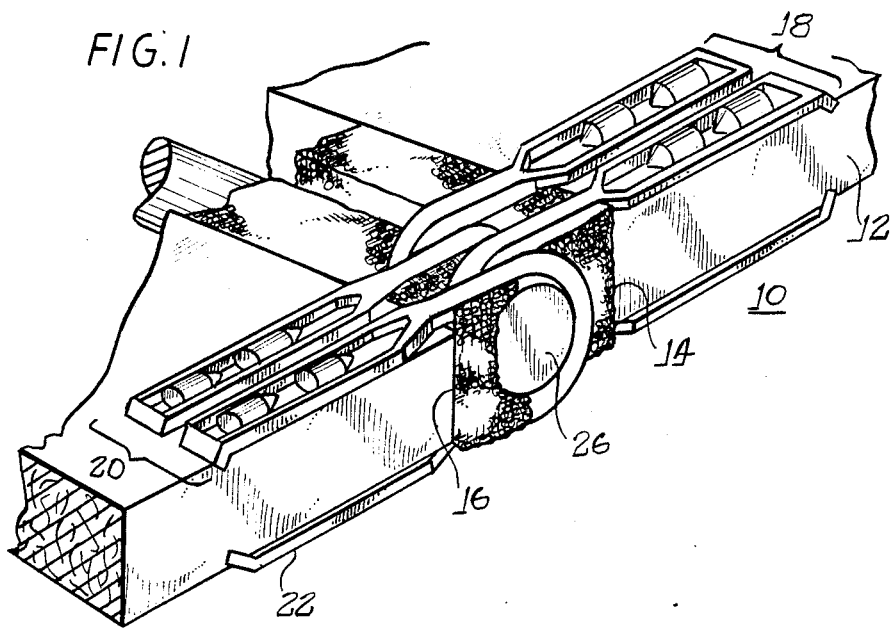
FIG. 1 a diagrammatic perspective view of an assembly of individual connector elements in intermeshed relationship.

Conveyor belts 12 are utilized to transfer products and packages. These belts are generally provided in predetermined lengths requiring assembly or joining of their ends 14,16 to form a continuous belt length. A variety of clamping or fastener assemblies 10 are utilized to clasp and couple these belt ends, whether in a new assembly or in the repair of a ruptured or torn belt. Other systems provide a plurality of plate clamps or staple-like individual fasteners extending from a belt end to form a loop, which belt end loops are intermeshed to receive a coupling device, that is usually a pin. Most earlier belt fasteners with multiple components, especially the wire coupling type fasteners, did not provide means for preventing particulate matter from sifting through the coupling joints. There were attempts at the prevention of sifting through the joint by inserting preformed and/or molded inserts in the loop between the loop separations and in the gap between the extending arm of the wire fastener. Some of the inserts included semicircular ends opposing each other to define a cylindrical bore to receive the hinge pin.

In the illustrated embodiment, the present invention provides a relatively narrow belt fasteners 22 which are U-shaped and relatively thin in width in the transverse direction of the belt, as opposed to the plate-type fasteners. The fasteners are connected by a joining means, such as a wire 90, to maintain the assembly in an aligned array for positioning in an automatic fastening device which secures the staples 72 to the belts. After the fasteners are secured to the belt ends by staples 72, a hinge pin 26 is inserted between intermeshed hinge loops 34 to couple the belt ends together to form a belt splice.

In accordance with the present invention, dust or fines are prevented or limited from sifting through the splice by elongated strips or blocks 15 of a compressible material which is easily compressed by the hinge pin 26 and/or the hinge loops 34 on the fasteners. The elongated blocks are preferably formed of a soft, compressible, open cell foam material of urethane or the like which are readily pushed inward by the hinge pin with little frictional resistance to the sliding of the hinge pin through the aligned hinge pin loops. Because these elongated blocks are soft and compressible they readily conform to the arcuate sides of the hinge pin and to the hinge loops thereby closing most holes through fines or dust may flow. When the blocks are used with belt fasteners having belt stops 38, the blocks are retained in position within the hinge loops by the belt stops 38. When the belt fasteners lack belt stops, end walls 87 on the belts will act as a retaining means to hold the blocks within the hinge loops during the stapling operation and during the insertion of the hinge pin through the intermeshed loops of the respective strips of belt fasteners.

The preferred elongated block is made of open cell, light weight urethane foam which is readily compressible with light pressures such as when being pushed by a hinge pin 24 being inserted into the intermeshed hinge loops 34. The legs and hinge loops 34 on the belt fasteners also will readily displace the foam body which will conform to and assume the shape of these metal surfaces. The illustrated elongated blocks are square in cross-section and are very soft and very lightweight, and are positioned in the space between the belt stops 38 and the hinge loops 34. The illustrated elongated blocks are 0.75 inch on a side for the illustrated fasteners, but obviously this dimension may be varied.

Because the elongated blocks are so soft and deformable, they may be readily pushed into position over top ends 38a of the belt stops 38 in the space 39 between these ends 38a and the undersides of the opposite legs 30 of the belt fasteners. Likewise, the elongated blocks may be pulled through the space 39 for removal if the user does not want this anti-sifting feature for the splice. In the illustrated embodiment, the fasteners are packaged in eighteen inch long strips and likewise the blocks 15 are of the same length. All of the strips are provided with a block 15 and the person making the splice may remove the blocks 15 if he does not want to use them. The blocks are inexpensive enough to be a disposable item.

Referring now in greater detail to a specific description of the invention, the assembly 10 has the belt 12, which may be a conveyor belt, with opposed first end 14 and second end 16; and, the first set 18 and a second set 20 of individual connectors or fasteners 22, which are mounted on first end 14 and second end 16, respectively. The individual connectors 22 of first set 18 mate or intermesh between the individual connectors 22 of second set 20. The intermeshed connectors 22 illustrated in FIG. 3 cooperate to define the hinge passage or aperture 24 for the hinge or connector pin 26 to couple first belt end 14 and second belt end 16, thus forming a continuous belt. The flexible, pliable blocks 15 in each of sets 18 and 20 is compressed between the intermeshed loops of connectors 22 of each set 18, 20 and each belt end 14, 16, respectively, and deformed or reformed to fill any voids or spaces between connectors 22, hinge pin 26 and belt ends 14, 16, thus preventing sifting of any fine particulate material through the coupling for subsequent air entrainment. The first and second connector sets 18 and 20 securing belt 12 are coupled by the hinge pin 26 along longitudinal axis 28 of belt 12, as illustrated in FIG. 4. It is appreciated that the individual connectors at the outer edge of the assembled sets will only be in contact with one of the opposed belt end connectors 22.

The individual connectors 22 have similar structures and thus a single connector will be described in detail. A side view of an individual preformed connector body 22 is illustrated in an open or unassembled condition in FIG. 2, and includes upper or first arm 30 and lower or second arm 32. Preformed connector body 22 may be shaped by any means known in the art, such as extruding, drawing or roll forming, for example. A connecting or bridging means 34, shown as an arcuate loop, connects upper arm 30 and lower arm 32, which arms 30, 32 and loop 34 cooperate to define individual connector 22 as a U-shaped or forked member with a gap 36 between the upper and lower arms 30 and 32. A positive stop 38 for a belt end, which is shown as a pin, is mounted on inner surface or face 40 of lower arm 32 and protrudes into gap 36 in a normal or vertical manner from inner surface 40. It is appreciated that stop 38 with a longitudinal axis could have been mounted on inner surface or face 42 of upper arm 30 in a normal or perpendicular manner. The utilization of a pin or cylindrical shape is a preferred embodiment and not a limitation, as it can be appreciated that a stop with a rectangular or other cross section could also have been utilized as a stop means.

Figure 2:
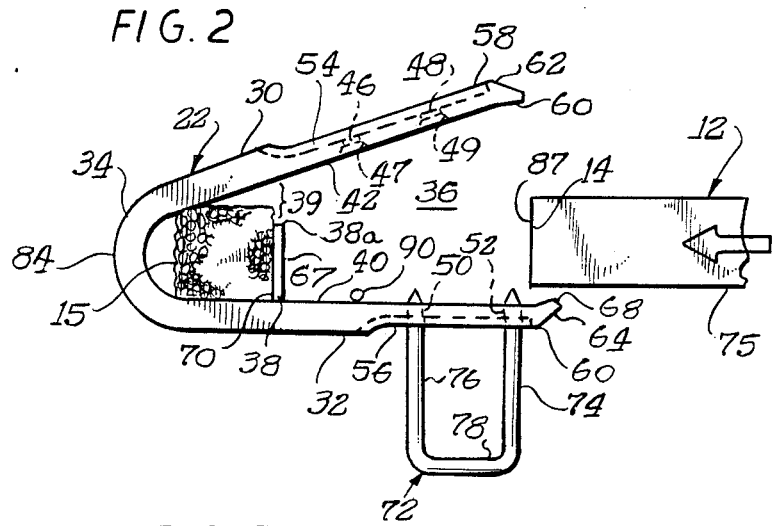
FIG. 2 is a side view of a member of the fastener strip ass and belt ends in an unassembled state.

In FIG. 2, upper arm 30 has a pair of openings or apertures 46 and 48 with countersunk or tapered portions 47 and 49, respectively, for receiving staple legs, which apertures extend through arm 30 and perpendicular to inner surface 42. Similarly, lower arm 32 has a pair of apertures 50, 52 extending through arm 32 and perpendicular to surface 40. Apertures 46, 48 and 50, 52 are in vertical alignment after insertion, final assembly and securing of the belt in the gap 36, as shown in FIG. 4.

Arm 30 has an end-forming groove 54 at outer surface 58 and arm 32 has a staple head groove 56, for receiving the head of a staple along the outer surface or face 60 of lower arm 32. Each of arms 30, 32 have a terminus or free end 62 and 64, respectively, opposite the loop 34. As shown, grooves 54, 56 extend along connector arms 30, 32 in a direction generally parallel to belt longitudinal axis 28 in the as-assembled state in FIG. 4. Affixed to terminus or outer free ends 62, 64 are inwardly inclined protuberances or gripper lips 66 and 68, respectively, which, as shown in FIG. 4, are inclined toward axis 28 from the inner surfaces 40 and 42. Arms 30 and 32 can generally be characterized as approximately mirror images or symmetrical arms, on either side of shoulder 34. However, upper groove 54 is or may be longer than groove 56 to receive the formed staple ends of a staple 72.

Figure 3:
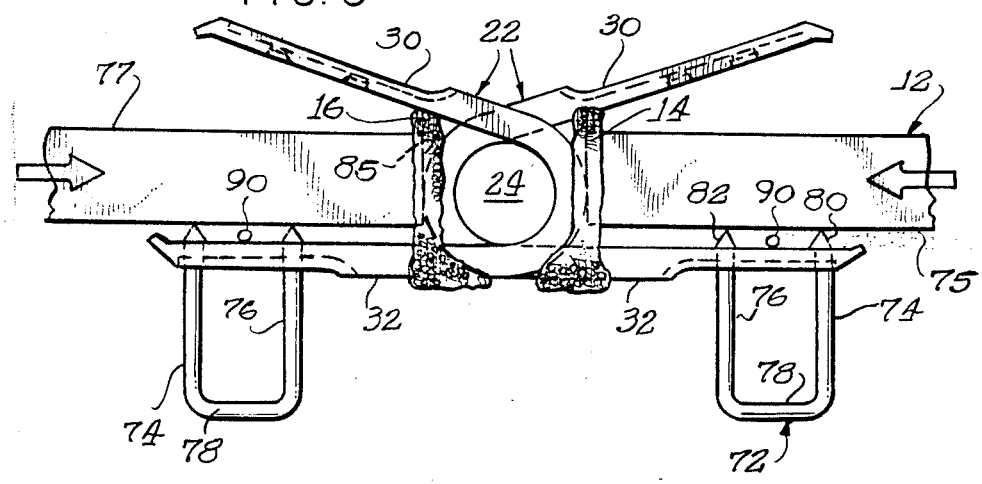
FIG. 3 is a side view illustrating a semi-finished assembly.

FIG. 2 illustrates a connector element 22 in the open or unassembled condition prior to final securing of belt ends 14 and 16. Positive belt stops 38, relative to hinge loop 34 and gap 36, have outwardly directed surfaces 67 and inwardly directed surfaces 70, that is, inward toward loop 34 and the closed portion of gap 36. Each loop 34 includes an outer rounded extremity surface 84, which at fastener assembly almost abuts an end wall of the opposite belt end, as shown in FIG. 3. As best seen in FIG. 2, belt end 14 has an end wall 87 to abut the surface 67 of stops 38 of the right hand set of belt fasteners 18 of FIG. 1. Similarly, belt end 16 has an end wall 85 to abut surface 67 of stops 38 of the left-hand set of belt fasteners 20. Also, the extremity surfaces 84 of hinge loops 34 of sets 18 and 20 are in close proximity to the opposite belt ends 85 or 87, as shown in FIG. 3. This deep penetration by hinge loop extremities 84 in proximity to the opposite belt allows stops 38 to be positioned as deeply as possible in gap 36 and ensures maximum belt reach-back. In this maximum reach-back position, the innermost leg 76 of a staple 72, as well as leg 74, (cf. FIGS. 2 and 3) is located at the greatest possible distance from the belt end wall 14 or 16, and the greater this distance the greater the belt mass that must be torn before a belt end can be pulled from the fastener 22. Therefore, the grip by connector elements 22 of belt ends 14 and 16 is increased. As illustrated in FIG. 5, the cross-sectional area of stop 38 is less than the width of loop body 34 or arms 30, 32, which minimizes the risk of contact from the opposed, intermeshed connectors 22. Thus, any anti-sifting structure must be compatible with the enhanced connector structure to enjoy the benefits of this improved connector as well as other connectors with hinge loop arrangements. As shown in FIG. 2, the flexible material 15 is inserted between positive stop 38 and loop 34 and generally occupies the volume therebetween. However, it is not required that the flexible material component 15 be preformed to conform to either the finished or prefinished fastener structure. The illustrated flexible material 15 in FIG. 2 has a rectangular cross-section but this shape is merely exemplary and not a limitation.

Securing means 72 are shown in FIGS. 2 and 3 as U-shaped staples having first leg 74 with staple end 80, second leg 76 with staple end 82, and connecting means or shoulder 78 coupling first and second legs 74, 76. Unassembled connectors 22 are illustrated with belt ends 14, 16 contacting posts 38. Belt 12 has a lower surface 75 and an upper surface 77. Belt lower surface 75 contacts staple ends 80 and 82 of securing means 72, which ends 80, 82, and first and second legs 74, 76 extend through lower arm passages 52 and 50, respectively. In the final or as-assembled state of FIG. 4, securing means 72 extends through belt 12, with staple ends 80 and 82 protruding through upper arm passages 48, 46, respectively, which are aligned with passages 50, 52. The staple ends are more easily directed into passages 48, 46 by the countersunk tapers 49, 47, respectively. The lower surface 75 of belt 12 contacts and is gripped or engaged by inner surface 40 of lower arm 32. Similarly, upper surface 77 of belt 12 contacts and grips inner surface 42 of upper arm 30. Thereafter, staple shoulder or coupling shoulder 78 is nested into groove 56 of lower arm 32 and staple ends 82 and 80 are deformed or bent to nest into groove 54, thus fastening staple 72.

As shown in FIGS. 4 and 5, opposing ends 14, 16 of belt 12 are similarly secured by connector strips or sets 18 and 20, which are a plurality of individual connectors 22, and the opposed connector strips are intermeshed to define passage 24 to receive hinge pin 26. As illustrated in the Figures, hinge pin 26 is approximately equal to the thickness of belt 12, but may be any size selected for the connectors. Hinge pin 26 may be secured in passage 24 by means known in the art. The intermeshed ends 84 of loops 34 nest in the separation distance 89 between the juxtaposed connections of the adjacent connectors of each set 18, 20 as shown in FIG. 5. In this nested or meshed arrangement the ends 84 of one of sets 18 and 20 contact flexible material 15 of the other of the sets 18. 20; the material 15 is compressed against the respective belt end walls 85, 87 and deflects to fill the voids or spaces between connectors 22, hinge pin 26 and belt ends 14 and 16. In this example, the belt end walls 85 and 87 are maintained in location against positive stops 38 and the elongated blocks of compressible or elastic material, which generally is a resilient material having an elastic characteristic allowing it to recover its unstressed shape after removal of the compressive or deforming load. As the block is not a rigid solid material, it freely deforms to fill the available spaces as depicted in FIGS. 1, 4 and 5 In the void-filling deformation, the material is generally confined to the area between one of end walls 85, 87 and hinge pin 26. Thus the material 15 has filled the areas between the end walls 85, 87, hinge pin 26 and connectors 22, and consequently sifting therethrough is prevented or severely inhibited. There is no appreciable wearing load on compressed material 15, as all the loadbearing or wearing conditions are only vertically applied on very small cross-sectional areas of compressed material 15. In addition, there is a nil horizontal load, as the loadbearing components are hinge pin 26, connectors 22, belt 12 and staples 72. In coal mines, the coal dust builds up within the open pores of the foamed plastic block and cakes about the block so that after running for a while the caked coal dust itself will prevent sifting of coal dust through the splice.

Multiple combinations or sets of individual connectors 22 are frequently utilized to secure conveyor belt ends, as the conveyor belts for most applications are of significant width and require more than one connector 22 on each belt end. Therefore, these individual connectors appear in ganged arrays or sets 18 and 20 as noted above, which is also the general case with plate-type fasteners. In the arrangement of these sets, the several extending stops 38 of connectors 22 of each set 18, 20 will have their longitudinal axes 44 generally parallel and in an aligned array along a single plane 86, as shown in FIG. 4. It can be seen that the individual positive stops 38 are recessed deeply in gap 36 for the belt. This gap depth; the relationship between extremity 84 and the belt ends; and, the position of stops 38 and the belt ends provides the maximum reach-back for each belt end, that is the depth of penetration into gap 36 by the conveyor belt ends from gripper lips 66, 68 of the fastener arms. Although the belt stops 38 are illustrated as mounted on each fastener 22, these stops 38 may also be mounted at spaced intervals, such as every second, third or fourth fastener. This arrangement is adequate to maintain resilient material 15 in position for assembly of the connectors, but it does not limit the use of the anti-sifting arrangement.

The maximum reach-back for belt ends 14 and 1 is shown in FIG. 4. Second belt end wall 85 nearly abuts exterior extremity surfaces 84 of the first set of hinge loops 18 and abuts surfaces 67 on belt stops 38 of the second set of fasteners 20. The second set of hinge loops have an interior surface abutting the hinge pin 26 on its right side. The hinge pin left side, as shown in FIG. 4, abuts the interior surface of the first set of loops, and the exterior extremity surface 84 of the first strip fastener loops nearly abuts the second belt end 16, which has end wall 85 abutting the second belt stop 38 on the second belt fastener. Thus, no substantial gaps or spaces are provided by the thickness of the belt stop as in the fasteners disclosed in U.S. Pat. No. 4,625,369, and the minimal gaps that remain, which would still allow fine particle sifting, are filled by resilient material 15 to prevent particle sifting therethrough.

The various arrays or sets 18 and 20 of connectors 22 in the Figures are maintained in their ranked or aligned positions, especially as illustrated by the maintenance of stops 38 in the aligned fashion, by a connecting means which is, in this instance, in the form of a rod or wire 90 secured to one of inner surfaces 40 or 42 of connector arms 30 and 32. In FIG. 3, the connecting wire 90 is illustrated between apertures 50 and 52 of lower arm 32 on inner surface 40, which is only an illustration and not a limitation. Wire or rod 90, which stretches across and is affixed to the faces of the aligned array of several connectors 22 to maintain them in an aligned position, is stiff enough to maintain them in their relative alignment, but may be readily broken to provide the number of belt fasteners needed for a particular belt width. In addition, it is noted that the wire or rod 90 may similarly be positioned in proximity to stop 38, such as between belt stop 38 and aperture 50, as illustrated in FIG. 2. Thus wire 90 may be affixed along the inner surfaces 40, 42 in any location which does not interfere with the structure and operation of the connectors 22. After assembly, rod 90 provides a further interference to movement of belt 12 and assists in maintaining belt 12 in its secured position. Wire or rod 90 can be secured to the faces 40, 42 by any means known in the art, such as welding, brazing or adhesive compound. Thus, the position of rod 90 is not compromised by resilient material 15, which does not interfere with nor inhibit either the structure or function of rod 90.

The illustrated belt fasteners 22 are formed from shaped pieces of wire that have been die formed to provide the wider staple-receiving ends on the arms. The staple receiving grooves 54 and 56 are also formed in a progressive die as are the apertures 46, 48, 50 and 52 in the respective arms. While in some other fasteners made of plates the belt stop is integral with the plate, the wire fasteners described herein have a non-integral belt stop 38, which is welded to the lower arm, but the stop could also be made integral with the arm. The preferred connecting means 90 is the above-noted wire, but could also be an integral piece interconnecting adjacent fasteners when the arms are plates, such as disclosed in U.S. Pat. No. 4,625,369. The present invention is described in connection with wire fasteners but it is intended to also be applicable to plate fasteners with end loops.

Although the above-noted description has been provided with respect to wire loop fasteners and plate-type fasteners with end loops and positive stops, it is appreciated that the resilient material can be used in any loop portion of intermeshed fasteners. Further, the resilient material in the above-noted structures is easily removed and replaced in the loop apertures during repair, disassembly and reassembly of belt end connectors. Thus, this structure is not limited to new assemblies as in the above-noted example.

The flexible material may be any material with an elastic characteristic indicative of a material that is compressible and expansible. As an example, the material may be a foamed, open or closed cell urethane with the above-noted compression-expansion characteristic. Further examples of flexible materials include but are not limited to: open or closed-cell polyester foam; a flexible isocyanate-derived polymer foamed cellular structure; reticulated organopolymeric foams including nylon and urethane foams with backbone carbon groups; and polymers from the group of polysiloxanes having pendant carbon groups. The particular material elected may require properties commensurate with the operating environment, such as operability with water or in ultraviolet light exposed areas.

While only specific embodiments of the invention have been described and shown, it is apparent that various alternatives and modifications can be made thereto. It is therefore, the intention in the appended claims to cover all such modifications and alternatives as may fall within the true scope of the invention.

What is claimed is:

1. A belt fastener assembly for fastening to a conveyor belt end and for reducing sifting of materials through the fastener assembly, said assembly comprising:
   a plurality of belt fasteners having upper and lower arms disposed in an open position with the arms disposed angularly relative to one another to define a belt receiving gap therebetween,
   connecting means joining adjacent belt fasteners together in aligned positions adjacent each other,
   a hinge loop on each fastener joining the upper and lower arms and being aligned by the connecting means to define a hinge pin receiving trough,
   an elongated body of soft, flexible, compressible resilient material spanning adjacent loops of the belt fasteners to reduce sifting of materials,
   said arms having a plurality of belt stops, said belt stops being on an arm and projecting toward the other of said arms to limit the insertion of the belt end into the gap between the arms, and said belt stops retaining said resilient body in place to reduce sifting,
   free ends on the belt stops spaced from the opposing other arms to define a slot,
   an elongated body of soft, flexible, compressible foamed material spanning adjacent loops of the belt fasteners,
   said body being confined between inner portions of the arms and the belt stops and the loops prior to clinching the belt fasteners to the belt end preparatory to connecting the two ends of the belt together,
   said arms in the open position extending beyond a parallel relationship such that a subsequent bending of the arms into parallel relationship against opposite sides of the belt squeeze the resilient body about the inner sides of the upper and lower arms and projects the resilient body into the space between adjacent arms, an inner side of the resilient body extending into the loops sufficiently that it must be displace outwardly toward the belt stops before a hinge pin is inserted into the loops, said resilient body having an uncompressed height greater than the dimension of said slot, said resilient body being compressible to be pushed through the slot into the hinge loops with manual pressure,
   each of said resilient bodies being compressed by the hinge loops of the other set of belt fasteners to change substantially the size and shape of the resilient bodies and to provide an opening for the hinge pin,
   said bodies being expandable and compressible with the hinge loops as the loops define different sizes of opening for different sizes of hinge pins to reduce sifting with different sizes of hinge pins.

2. belt fastener assembly in accordance with claim 1 in which said body is an open cell, urethane foam block.

* * * * *

UNITED STATES PATENT AND TRADEMARK OFFICE
CERTIFICATE OF CORRECTION

PATENT NO. : 4,937,921
DATED : July 3, 1990
INVENTOR(S) : Edward C. Musil

It is certified that error appears in the above-identified patent and that said Letters Patent is hereby corrected as shown below:

Column 3, line 8, following "A length of" insert --flexible, open-cell reticulated material extends through"--.
Column 3, line 61, after "numerals" insert --identify like--.
Column 3, line 62, after "FIG. 1" insert --is--.
Column 3, line 66, change "ass" to --assembly--.
Column 4, line 30, after "provides" delete "a".
Column 7, line 41, after "18." delete "." and insert in its place --,--. (comma)
Column 7, line 52, after "5" insert --.-- (period)
Column 8, line 26, change "1" to --16--.
Column 10, line 39 (Claim 1), change "displace" to --displaced--.

UNITED STATES PATENT AND TRADEMARK OFFICE
CERTIFICATE OF CORRECTION

PATENT NO. : 4,937,921
DATED : July 3, 1990
INVENTOR(S) : Edward C. Musil

It is certified that error appears in the above-identified patent and that said Letters Patent is hereby corrected as shown below:

Column 10, line 54, (Claim 2) change "belt" to
--A belt--.

Signed and Sealed this

Twenty-sixth Day of May, 1992

*Attest:*

DOUGLAS B. COMER

*Attesting Officer*     *Acting Commissioner of Patents and Trademarks*